(12) United States Patent
Tang et al.

(10) Patent No.: US 11,174,575 B2
(45) Date of Patent: Nov. 16, 2021

(54) PREPARING METHOD OF HIGH-MODULUS-LOW-SHRINKAGE ACTIVATED PET INDUSTRIAL YARN

(71) Applicant: JIANGSU HENGLI CHEMICAL FIBRE CO., LTD., Wujiang (CN)

(72) Inventors: Fangming Tang, Wujiang (CN); Shanshui Wang, Wujiang (CN); Damao Yang, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 17/051,442

(22) PCT Filed: Oct. 28, 2019

(86) PCT No.: PCT/CN2019/113658
§ 371 (c)(1),
(2) Date: Oct. 29, 2020

(87) PCT Pub. No.: WO2020/134490
PCT Pub. Date: Jul. 2, 2020

(65) Prior Publication Data
US 2021/0230776 A1    Jul. 29, 2021

(30) Foreign Application Priority Data
Dec. 27, 2018  (CN) .......................... 201811615745.3

(51) Int. Cl.
| | | |
|---|---|---|
| *C07C 29/141* | (2006.01) | |
| *C07C 29/145* | (2006.01) | |
| *D01D 5/08* | (2006.01) | |
| *D01D 7/00* | (2006.01) | |
| *D01F 6/62* | (2006.01) | |
| *D02J 1/22* | (2006.01) | |
| *D02J 13/00* | (2006.01) | |
| *D01F 6/92* | (2006.01) | |
| *C08G 63/183* | (2006.01) | |
| *C08G 63/86* | (2006.01) | |
| *D01D 5/088* | (2006.01) | |
| *D01D 5/16* | (2006.01) | |
| *D01D 10/02* | (2006.01) | |
| *D01F 1/10* | (2006.01) | |

(52) U.S. Cl.
CPC ............ *D01F 6/92* (2013.01); *C08G 63/183* (2013.01); *C08G 63/866* (2013.01); *D01D 5/088* (2013.01); *D01D 5/16* (2013.01); *D01D 10/02* (2013.01); *D01F 1/10* (2013.01); *D02J 1/229* (2013.01); *D10B 2401/062* (2013.01); *D10B 2401/063* (2013.01)

(58) Field of Classification Search
CPC ... C07C 29/141; C07C 29/145; C08G 63/183; C08G 63/866; D01D 5/08; D01D 5/088; D01D 7/00; D01D 10/02; D01F 1/10; D01F 6/62; D02J 1/22; D02J 1/229; D02J 13/00
USPC ............ 264/210.2, 210.5, 210.6, 210.8, 211, 264/211.12, 211.14, 211.15, 211.17, 264/331.21, 342 RE; 528/308.1, 308.2, 528/308.3; 568/862
See application file for complete search history.

(56) References Cited

U.S. PATENT DOCUMENTS 4,113,704 A    9/1978  MacLean et al.

FOREIGN PATENT DOCUMENTS

| | | |
|---|---|---|
| CN | 108385188 A | 8/2018 |
| CN | 108385418 A | 8/2018 |
| CN | 109735942 A | 5/2019 |
| CN | 109750380 A | 5/2019 |
| CN | 109763194 A | 5/2019 |
| KR | 101734892 B1 | 5/2017 |

OTHER PUBLICATIONS

Translation of CN 108385188 A (published on Aug. 10, 2018).*
Translation of CN 109750380 A (published on May 14, 2019).*

* cited by examiner

*Primary Examiner* — Leo B Tentoni
(74) *Attorney, Agent, or Firm* — Bayramoglu Law Offices LLC

(57) ABSTRACT

A type of high-modulus-low-shrinkage activated PET industrial yarn and preparing method thereof are disclosed. The preparing method is to manufacture filament from a modified polyester, which is the product of the esterification and the successive polycondensation reactions of evenly mixed terephthalic acid, ethylene glycol and tert-butyl branched heptanediol, through a series of processes composed of viscosity enhancing by solid state polycondensation, melting, metering, extruding, cooling, oiling, stretching, heat setting, relaxation heat-treating, oiling with activation oil, winding and pre-activation treatment. The relaxation heat-treating indicates passing the modified polyester yarns through a space with a certain temperature within 200-220° C. under a proper relaxation state; and the proper relaxation state means a 3.0-5.0% of overfeed for the winding. The improvement of activator efficiency by importing the tert-butyl branched diol into the polyester, together with the synergistic effect of heat setting temperature and high winding overfeed rate, will reduce the fiber thermal shrinkage.

10 Claims, No Drawings

PREPARING METHOD OF HIGH-MODULUS-LOW-SHRINKAGE ACTIVATED PET INDUSTRIAL YARN

CROSS REFERENCE TO THE RELATED APPLICATIONS

This application is the national phase entry of International Application No. PCT/CN2019/113658, filed on Oct. 28, 2019, which is based upon and claims priority to Chinese Patent Application No. 201811615745.3, filed on Dec. 27, 2018, the entire contents of which are incorporated herein by reference.

TECHNICAL FIELD

The present invention belongs to the field of polyester fiber and relates to one type of high-modulus-low-shrinkage activated polyester industrial yarn and preparing method thereof, and more particularly, relates to the method of preparing high-modulus-low-shrinkage activated polyester industrial yarn through modification for polyethylene terephthalate.

BACKGROUND

Polyethylene terephthalate (PET) fiber, known as one of the most important synthetic fibers, is obtained through melt spinning and postprocessing the fiber-forming PET synthesized from terephthalic acid or dimethyl terephthalate together with ethylene glycol by means of esterification or transesterification followed by polycondensation. Since inception, PET fiber has been widely applied in many fields such as industry and automobile because of its high breaking strength, high elastic modulus, moderate resilience, excellent thermal setting, and good resistance to heat, light, acid, alkali and corrosion.

Although having the advantages of high strength, low elongation and stable dry heat shrinkage, the PET industrial yarn, compared with viscose or nylon, shows much lower adhesion to other polymer material such as rubber. Therefore, PET industrial yarn usually needs to be activated through the preprocessing before the utilization.

However, the backbone of PET is composed of rigid benzene rings and flexible alkylene chains which are connected by ester groups, moreover, the benzene rings and the ester groups are bonded up to form a stable conjugate structure so that almost all benzene rings are lying in one plane. Therefore, PET has a symmetric straight molecular chain without side groups, and is easy to aggregate to form a dense structure with high crystallinity and high orientation, which is unfavorable to the diffusion of the activation molecules. In practice, the activation treatment of the PET industrial yarn needs to be carried out under a high temperature for a long time, which will cause the tension relaxation so as to effect the mechanical properties of the fiber.

With the development of modern industry and high-tech, as well as the gradual saturation of the market, much higher requirements of novel performance have been drawn upon the PET industrial yarn. Shrinkage, as one of the most important performance indices of the PET industrial yarn, is different from the common reversible heat expansion and cold contraction, it means the irreversible heat contraction which will be more obvious when the fiber is washed in hot water or be ironed. The fabrics or rubber products made of low-shrinkage PET industrial yarn will show good dimension stability, thermal stability and shock resistance. Therefore, the low-shrinkage PET industrial yarn is suitable for the preparation of coated fabric, conveyor belt weft and so on. According to the existed techniques, low-shrinkage PET industrial yarn could be made under the controlled overfeed and tension heat setting. However, the fiber length under the tension heat setting is fixed and unchangeable, which will restrain the folding of macromolecular chains and restrict the growth of crystalline grain so as to result in crystalline defects and affect the further reduction of fiber shrinkage.

Therefore, it is of great significance to develop a kind of high-modulus-low-shrinkage activated PET industrial yarn with high activation effect and low thermal shrinkage as well as the preparing method thereof.

SUMMARY

The primary object of the present invention is to provide one kind of high-modulus-low-shrinkage activated PET industrial yarn with high activation effect and low thermal shrinkage as well as the preparing method thereof, so as to overcome the wherein said inadequacies in the existed technology.

To this end, the key technical points of the invention are as follows:

The preparing method of the high-modulus-low-shrinkage activated PET industrial yarn, characterized by manufacturing filament from a modified polyester through a series of processes composed of viscosity enhancing by solid state polycondensation, melting, metering, extruding, cooling, oiling, stretching, heat setting, relaxation heat-treating, oiling with activation oil, winding and pre-activation treatment;

wherein said modified polyester before the viscosity enhancing by solid state polycondensation is the product of the esterification and the successive polycondensation reactions of evenly mixed terephthalic acid, ethylene glycol and tert-butyl branched heptanediol which has a molecular formula of

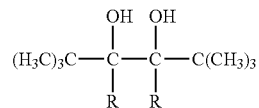

(Formula 1)

with R standing for —H, —CH$_2$CH$_3$ or —C(CH$_3$)$_3$ (which will form 2,6,6-trimethyl-2,5-heptanediol, 2,6,6-trimethyl-5-ethyl-2,5-heptanediol or 2,6,6-trimethyl-5-isopropyl-2,5-heptanediol, respectively. The incorporation of those tert-butyl branched heptanediol will change the mobility of polyester main chains so as to change the interaction and the distance between the polyester segments, which will enlarge the free volume of the modified polyester. Accordingly, some activator molecules can diffuse into the fiber voids via the enlarged free volume and bring a high activation effect with lower activation temperature and less activation time, hence the mechanical properties of the fiber could be maintained and the adhesion to the rubber could be improved;

wherein said relaxation heat-treating indicates passing the modified polyester yarns through a space with a certain temperature under a proper relaxation state;

therein the proper relaxation state means a 3.0-5.0% of overfeed for the winding;

therein the certain temperature ranges within 200-220° C.

In the present invention, the shrinkage reduction of polyester industrial yarn is realized through the coordination between heat treatment temperature and overfeeding rate. The crystallization of PET fiber under the heat-treating will be promoted by the folding of molecular chains in the amorphous region, which at the apparent is manifested as the shrinkage of PET fiber, and the influence of the shrinkage on the fiber winding and crystallization could be offset by the winding overfeed.

Prepared through the preferred technology program that will concretely described below, herein obtained high-modulus-low-shrinkage activated PET industrial yarn has the following performance indices: fineness 930-1670 dtex, breaking strength ≥7.8 cN/dtex, deviation rate of linear density ±1.2%, breaking strength CV value ≤2.5%, elongation at break 11.0~13.5%, deviation rate of elongation ±1.5%, elongation at break CV value ≤8.0%, elongation at 4.0 cN/dtex load 6.0~7.0%, deviation rate of elongation at 4.0 cN/dtex load ±0.8%, interlacing degree 6±2-3/m, which are close to those of the common low shrinkage polyester industrial yarn obtained from the existed techniques;

herein obtained high-modulus-low-shrinkage activated PET industrial yarn has a dry heat shrinkage of 2.5±0.5% tested under the condition of 177° C.×10 min×0.05 cN/dtex whereas the contrast value is 3.0±0.5% for the sample of the existed techniques, and shows a static adhesion of 49-53N or 55-62N to the vulcanized rubber determined through H-pull method when made into cord with a specification of 1100 dtex/192 F or 1670 dtex/192 F.

In the preparing method of the high-modulus-low-shrinkage activated PET industrial yarn herein, wherein said space with a certain temperature indicates the room formed by a pair of parallel hot plates located between the last set of heat setting rollers and winding roller; therein the hot plates are aligned in both side and have a length of 3.0-4.0 m along the passing direction of fiber; therein the fiber passes through the center of two hot plates and keep a distance of 5-10 mm from both sides, therein the hot plates are 300-400 mm from the winding roller and 200-300 mm from the last set of heat setting rollers, therein the temperatures of hot plates, the lengths of hot plates and the distances between the fiber and the hot plates are well designed to ensure that the PET macromolecules will gain enough energy to fully crystallize with a high efficiency, so as to reduce the thermal shrinkage of PET yarn in the application;

wherein said tert-butyl branched heptanediol is synthesized by means of:

(1) mixing isobutanol and 40-50% of KOH aqueous solution in the molar ratio of isobutanol to KOH as 5-6:1, then carrying out the reaction with a stirring at 100-110° C. for 4-5 hr to obtain potassium isobutanol;

(2) removing the impurities from the system in step (1), then adding in xylene in the molar ratio of isobutanol to xylene as 1.3-1.5:2.0-3.0 and cooling the system to 0-5° C.;

(3) adding 3-methyl-3-hydroxybutyne and M (is 2,2-dimethylpropionaldehyde, 2,2-dimethyl-3-pentanone, 2,2,4-trimethyl-3-pentanone or 2,2,4,4-tetramethyl-3-pentanone when R=—H, —CH$_2$CH$_3$, —CH(CH$_3$)$_2$ or —C(CH$_3$)$_3$ in Formula 1, respectively) into the system of step (2) in a molar ratio of 3-methyl-3-hydroxybutyne:M:xylene as 1:1.2-1.3:2.0-3.0, then starting the reaction at 25-35° C. for 3 hr, and obtaining octyne diol after a series of processes of cooling crystallization, centrifugation and drying;

(4) mixing octyne diol, ethanol and Pd catalyst in a weight ratio of 2-3:10:0.01-0.03 and then carrying out the reaction accompanied with a continuous hydrogen input at 40-50° C. for 50-60 min, finally obtaining the tert-butyl branched heptanediol through a series of processes of separation and purification;

wherein said modified polyester prior to the viscosity enhancing by solid state polycondensation is prepared by means of:

(1) Esterification concocting terephthalic acid, ethylene glycol and tert-butyl branched heptanediol into a slurry, then adding in the catalyst, the matting agent and the stabilizer and carrying out the esterification in a nitrogen atmosphere with a pressure of normal value-0.3 MPa at 250-260° C., finally ending the reaction when the water distillation reaching more than 90% of the theoretical value;

(2) Polycondensation for the esterification products, smoothly reducing the pressure to less than 500 Pa within 30-50 min and carrying out reaction at 250-260° C. for 30-50 min, successively, further reducing the pressure to less than 100 Pa and continuing the reaction at 270-282° C. for 50-90 min.

In the preparing method of the high-modulus-low-shrinkage activated PET industrial yarn hereinabove, the molar ratio of terephthalic acid, ethylene glycol and tert-butyl heptanediol is 1:1.2-2.0:0.03-0.05, and being relative to the amount of terephthalic acid, the additions of the catalyst, the matting agent and the stabilizer are respectively 0.03-0.05 wt %, 0.20-0.25 wt % and 0.01-0.05 wt %, therein the amount of tert-butyl branched heptanediol should be adjusted within a proper range to avoid effecting the fiber strength (if too high) or the low activation efficiency (if too low).

In the preparing method of the high-modulus-low-shrinkage activated PET industrial yarn hereinabove, wherein said catalyst is one of antimony trioxide, antimony glycol or antimony acetate, wherein said matting agent is titanium dioxide, and wherein said stabilizer is one of triphenyl phosphate, trimethyl phosphate or trimethyl phosphite;

wherein said modified polyester has a molecular weight of 25000-30000 Da and a molecular weight distribution index of 1.8-2.2 prior to the viscosity enhancing by solid state polycondensation, and after has an intrinsic viscosity of 1.0-1.2 dL/g;

wherein said spinning process involves the technological parameters of 295-315° C. for the extruder temperature, 295-300° C. for the spin head temperature, 175±5 bar for the spin head pressure, 23±2° C. for the cross air temperature, 75±5% for the cross air humidity, 0.5-0.6±0.05 m/s for the cross air blow speed, 0.4-0.5 wt % for the oiling rate of activation oil agent, 0.16±0.02 MPa for the pre-interlacing pressure, 0.22±0.02 MPa for the interlacing pressure, 2630-3300 m/min for the winding speed, 70-75° C. for the pre-activation treatment temperature and 15-20 hr for the pre-activation treatment time;

wherein said stretching and heat setting processes involve the technological parameters of 500-600 m/min for the roller 1 speed, 520-1000 m/min for the roller 2 speed, 80-100° C. for the roller 2 temperature, 1800-2500 m/min for the roller 3 speed, 100-150° C. for the roller 3 temperature, 2800-3500 m/min for the roller 4 speed, 200-250° C. for the roller 4 temperature, 2800-3500 m/min for the roller 5 speed, 200-250° C. for the roller 5 temperature, 2720-3410 m/min for the roller 6 speed, 150-200° C. for the roller 6 temperature.

The mechanism of this invention could be described as follows.

The accumulation of macromolecular chains in polymer are not so compact that there still exist some gaps between those chains, which are known as the free volumes. Enough free volumes are necessary for small molecules to diffuse and penetrate into the polymer, and within certain range, the larger the free volume, the better the diffusivity and the higher the permeability. The free volume can be classified by void one and slit one, and the void free volume is more efficient for the penetration of small molecules.

The size and class of free volume are dependent on the polymer structures such as steric hindrance, side group size and side group structure, etc. When a certain site in polymer main chain is substituted by a side group, the mobility of the main chain will be changed, as a result, the interaction force and the distance between polymer chains, as well as the cohesive energy and the free volume of polymer, will vary accordingly. In fact, the polarity, the size and length of side substitution group can draw influences on the rigid, the molecular interaction, and even the free volume of polymer. Therefore, different side groups will lead to different penetration performance.

The backbone conformation of the straight-chain diols, such as ethylene glycol and 1,4-butanediol, is like a zigzag almost lying in a plane. When a H atom of one certain methylene group in the main chain is substituted by a methyl group, the side C atom will locate at one vertex of the tetrahedron formed by the sp3 hybridization of the connected main chain C atom. Meanwhile, the side C atom itself is of sp3 hybridization to form another tetrahedron, therefore, the methyl substitution group cannot lie in the zigzag plane. Furthermore, if the H atoms in methyl group are further substituted by other methyl groups to from a tert-butyl group more such tetrahedrons will be formed. Hence it is easy to understand the tert-butyl substituted polyester will possess a complicated molecular conformation different far from the zigzag to ensure much more void free volumes. However, if a long side chain instead of methyl group is bonded to the polyester backbone, the increase of free volume will be mainly owing to the slit one which is not so sufficient to promote the penetration. Moreover, the long alkyl side chain is easy to cause entanglement because of its flexibility, which is also make against the increase of free volume.

In the present invention, the activation efficiency of the high-modulus-low-shrinkage PET industrial yarn is improved by introducing the tert-butyl branded heptanediol into the PET molecular chains, wherein the tert-butyl branded heptanediol has a molecular formula as

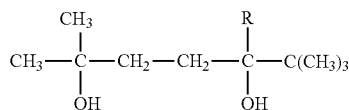

with R standing for —H, —CH$_2$CH$_3$ or —C(CH$_3$)$_3$, respectively.

The existence of the tert-butyl branded heptanediol in PET will change the mobility of the main chain of PBT so as to change the interaction force and the distance between PET molecular chains, finally enlarging the void free volumes of PET. Compared with short substitution chains such as methyl or ethyl group, the tert-butyl group has a larger space occupation which can gain larger free volume in the molecular aggregate. Whereas compared with long substitution chains, the tert-butyl group will mainly provide the void free volume with larger size than that of the slit free volume which generated mainly by the long side chains, furthermore, the tert-butyl group, with a higher rigidity prior to the long alkyl chains, will seldom cause the entanglement of polymer chains. Usually PET yarn is difficult to gain an idea activation effect because of its high crystallinity and low active group content. However, with an increased void free volume provided by the incorporation of the tert-butyl branded heptanediol, herein obtained PET industrial yarn could be activated with high efficiency, low temperature, shorter time and less strength loss so as to achieve significant adhesion to the rubber materials because the activator molecules can diffuse more easily into the fiber.

Furthermore, PET fiber will be orientated and partially crystallized during the stretching process and lost further elongation or deformation work, however, although most stretching induced deformation are the irreversible plastic deformation at room temperature which are fixed by the crystallization, there are still some that will resume even at room temperature with the relaxation of stretching tension, not to speak of the shrinkage recovery in the following heat setting process. In the application, this shrinkage will draw heavy influences on the fiber performance such as safety, durability, etc. For instance, PET fiber, if used as tire cord, will be stretched, compressed and bent time and again and the generated heat can cause the fiber shrinkage, nevertheless excessive shrinkage will cause the degumming or even the disintegrating which can seriously reduce the tire safety. In practice, the shrinkage of multi-step-stretched PET industrial yarn is controlled as far as possible through the subsequent tension heat setting, and from the tension heat setting to the final winding there also is a 1-2% overfeeding. Under the treatment of certain temperature and tension, the mobility of PET segments will be promoted and the aggregation of PET molecular chains will become closer, resulting in a larger average grain size and a higher crystallinity, hence the fiber shrinkage can be reduced. However, the high elastic strain generated by the stretching will relax when the tension is turned down, therefore, a proper overfeeding, i.e., the winding speed being slightly slower than the line speed of the last set of heat setting rollers, need to be set up for the PET yarn so as to ensure the stable and neat package. Usually the overfeeding rate should be well controlled within 1-2% otherwise both the fiber quality and the fiber package will suffer from the excess. The composition of tension heat setting and wind overfeeding can reduce the shrinkage of PET yarn to a certain extent, however, the fixed length of PET yarn during the heat setting will restrict the molecular chain folding so as to reduce the fiber crystallinity and this crystallization defect cannot be eliminated by wind overfeeding alone, resulting in a relatively large shrinkage when such fiber meet heat in the application.

As a matter of fact, relaxation heat setting, i.e., thermal treatment without tension or with fairly small tension, is an alternative process for the PET fiber except the tension heat setting, in which the fiber can recover freely and the molecular chains in amorphous region can easily form folding hence the treated fiber will possess relatively high crystallinity especially when the treat time is long enough, meanwhile, the high elastic strain and the internal stress can relax adequately. Therefore, the fiber from the relaxation setting usually shows a low heat shrinkage in the applications. However, such treatment, mainly adopted for the staple fibers in present, need a process under a relatively low temperature (about 130° C.) for a long time and be not suitable for the filament yarn.

In the present invention, the wind overfeeding rate is turned up to 3-5%, and a pair of parallel hot plates is installed between the last set of heat setting rollers and the winding roller. When the PET yarn passing through the center of hot plates, the crystallization is further promoted, the high elastic strain and the internal stress generated in the heat setting can be relaxed to some extent, hence the thermal shrinkage of PET yarn in the application can be reduced. Specifically, during the heat treatment of hot plates the PET molecular chains in the amorphous region can easily fold to promote the crystallization, which will generate the fiber shrinkage. This shrinkage, together with the high elastic strain generated in the tension heat setting, can be eliminated through the higher wind overfeeding. Therefore, through the controlling of the temperatures, the lengths and the distance to fiber of the hot plates, the crystallization integrity and the dimension stability of PET industrial yarn could be improved so as to reduce the fiber shrinkage in the future applications, and the presently existed problem of relaxation heat setting being not suitable for the filament producing could also be overcome.

In conclusion, the present invention provides (1) a method for preparing the high-modulus-low-shrinkage activated PET industrial yarn, wherein the fiber shrinkage in the applications is reduced through the improved fiber crystallization integrity resulted from the combination of heat treatment temperature and high wind overfeeding rate;

(2) a method for preparing the high-modulus-low-shrinkage activated PET industrial yarn, wherein the fiber activation efficiency is improved with lower activation temperature, shorter activation time and less fiber strength loss through the incorporation of the tert-butyl branched heptanediol into PET;

(3) a method for preparing the high-modulus-low-shrinkage activated PET industrial yarn with advantages of low cost, easy to operate and appreciable application value.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

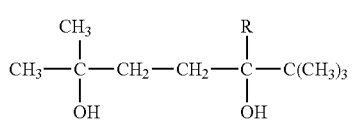

Formula (I)

Example 1

A method for preparing the high-modulus-low-shrinkage activated PET industrial yarn, comprising the steps:

(1) Preparation of modified polyester (1.1) Synthesizing 2,6,6-trimethyl-2,5-heptanediol (a) mixing isobutanol and 43% of KOH aqueous solution in the molar ratio of isobutanol to KOH as 5:1, then carrying out the reaction with a stirring at 100° C. for 4 hr to obtain potassium isobutanol;

(b) removing the impurities from the system in step (a), then adding in xylene in the molar ratio of isobutanol to xylene as 1.3:2.2 and cooling the system to 1° C.;

(c) adding 3-methyl-3-hydroxybutyne and 2,2-dimethylpropionaldehyde into the system of step (b) in a molar ratio of 3-methyl-3-hydroxybutyne:2,2-dimethylpropionaldehyde:xylene as 1:1.2:2.2, then starting the reaction at 25° C. for 3 hr, and obtaining octyne diol after a series of processes of cooling crystallization, centrifugation and drying;

(d) mixing octyne diol, ethanol and Pd catalyst in a weight ratio of 2.2:10:0.01 and then carrying out the reaction accompanied with a continuous hydrogen input at 50° C. for 50 min, finally obtaining 2,6,6-trimethyl-2,5-heptanediol (just as demonstrated in Formula (I) with R=—H) through a series of processes of separation and purification;

(1.3) Esterification concocting terephthalic acid, ethylene glycol and 2,6,6-trimethyl-2,5-heptanediol with an molar ratio of 1:1.2:0.05 into a slurry, then adding in antimony trioxide, titanium dioxide and triphenyl phosphate and carrying out the esterification in a nitrogen atmosphere with a pressure of normal value at 250° C., finally ending the reaction when the water distillation reaching 90% of the theoretical value, wherein the additions of antimony trioxide, titanium dioxide and triphenyl phosphate being 0.03 wt %, 0.25 wt % and 0.01 wt % relative to the amount of terephthalic acid, respectively;

(1.3) Polycondensation for the esterification products, smoothly reducing the pressure to 500 Pa (absolute value) within 30 min and carrying out reaction at 250° C. for 30 min, successively, further reducing the pressure to 100 Pa (absolute value) and continuing the reaction at 270° C. for 50 min, and finally obtaining a modified polyester with a molecular weight of 30000 Da and a molecular weight distribution index of 1.8;

(1.4) increasing the intrinsic viscosity of the modified polyester to 1.0 dL/g through the solid state polycondensation;

(2) converting the modified polyester into the high-modulus-low-shrinkage activated PET industrial yarn through a melt spinning technique including a series of steps such as melting, metering, extruding, cooling, oiling, stretching, heat setting, relaxation heat-treating, oiling of activation oil agent, winding and pre-activation treating.

The relaxation heat-treating indicates passing the PET yarns, with a wind overfeeding rate of 4.9%, through the space formed by a pair of parallel hot plates (200° C.), therein the hot plates is installed between the last set of heat setting rollers and the winding roller, therein the hot plates are aligned in both side and have a length of 3.0 m along the passing direction of fiber; therein the fiber passes through the center of two hot plates and keep a distance of 5 mm from both sides, therein the hot plates are 300 mm from the winding roller and 200 mm from the last set of heat setting rollers.

The technological parameters of the melt spinning are listed in Table 1 and those of the stretching and the heat setting are list in Table 2.

The final obtained high-modulus-low-shrinkage activated PET industrial yarn possess the performance indices of fineness 930 dtex, breaking strength 7.8 cN/dtex, deviation rate of linear density −1.2%, breaking strength CV value 2.5%, elongation at break 11.0%, deviation rate of elongation ±1.5%, elongation at break CV value 8.0%, elongation at 4.0 cN/dtex load 6.0%, deviation rate of elongation at 4.0 cN/dtex load −0.8%, interlacing degree 3/m, dry heat shrinkage 2.0% (tested under the condition of 177° C.×10 min× 0.05 cN/dtex), static adhesion to the vulcanized rubber 49 N or 55 N (determined through H-pull method when made into cord with a specification of 1100 dtex/192 F or 1670 dtex/192 F, respectively).

Comparison 1

A method for preparing the high-modulus-low-shrinkage activated PET industrial yarn involved steps basically the same as those in Example1, except for no relaxation heat setting, winding speed being 2680 m/min, wind overfeeding rate being 1.47% and without using 2,6,6-trimethyl-2,5-heptanediol when preparing the polyester, from which the finally obtained high-modulus-low-shrinkage activated PET industrial yarn possesses the mechanical performance indices of fineness 913 dtex, breaking strength 7.65 cN/dtex, deviation rate of linear density −1.1%, breaking strength CV value 2.5%, elongation at break 12.7%, deviation rate of elongation 1.5%, elongation at break CV value 8.0%, elongation at 4.0 cN/dtex load 6.8%, deviation rate of elongation at 4.0 cN/dtex load −0.8%, interlacing degree 3/m, dry heat shrinkage 3.2% (tested under the condition of 177° C.×10 min×0.05 cN/dtex), static adhesion to the vulcanized rubber 46 N or 52N (determined through H-pull method when made into cord with a specification of 1100 dtex/192 F or 1670 dtex/192 F, respectively).

Comparison 2

A method for preparing the high-modulus-low-shrinkage activated PET industrial yarn involved steps basically the same as those in Example1, except for no relaxation heat setting, winding speed being 2680 m/min, and wind overfeeding rate being 1.47%, from which the finally obtained high-modulus-low-shrinkage activated PET industrial yarn possesses the mechanical performance indices of fineness 913 dtex, breaking strength 7.68 cN/dtex, deviation rate of linear density −1.1%, breaking strength CV value 2.5%, elongation at break 12.5%, deviation rate of elongation ±1.5%, elongation at break CV value 8.0%, elongation at 4.0 cN/dtex load 6.9%, deviation rate of elongation at 4.0 cN/dtex load −0.8%, interlacing degree 3/m, dry heat shrinkage 3.2% (tested under the condition of 177° C.×10 min× 0.05 cN/dtex), static adhesion to the vulcanized rubber 49N or 55N (determined through H-pull method when made into cord with a specification of 1100 dtex/192 F or 1670 dtex/192 F, respectively).

Comparison 3

A method for preparing the high-modulus-low-shrinkage activated PET industrial yarn involved steps basically the same as those in Example1, except for not using 2,6,6-trimethyl-2,5-heptanediol when preparing the polyester, from which the finally obtained high-modulus-low-shrinkage activated PET industrial yarn possesses the mechanical performance indices of fineness 930 dtex, breaking strength 7.78 cN/dtex, deviation rate of linear density −1.1%, breaking strength CV value 2.5%, elongation at break 10.8%, deviation rate of elongation ±1.5%, elongation at break CV value 8.0%, elongation at 4.0 cN/dtex load 6.1%, deviation rate of elongation at 4.0 cN/dtex load −0.8%, interlacing degree 3/m, dry heat shrinkage 2.1% (tested under the condition of 177° C.×10 min×0.05 cN/dtex), static adhesion to the vulcanized rubber 46N or 52N (determined through H-pull method when made into cord with a specification of 1100 dtex/192 F or 1670 dtex/192 F, respectively).

From the data analysis on the Example 1 and Comparison 1-3, it can be concluded that the incorporation of 2,6,6-trimethyl-2,5-heptanediol in the present invention could improve the efficiency of the activator agent so as to promote the activation performance of PET industrial yarn, whereas the relaxation heat setting could significantly reduce the heat shrinkage rate of the PET industrial yarn.

Comparison 4

A method for preparing the high-modulus-low-shrinkage activated PET industrial yarn involved steps basically the same as those in Example1, except for using 1,2-dodecyl glycol instead of 2,6,6-trimethyl-2,5-heptanediol when preparing the polyester, from which the finally obtained high-modulus-low-shrinkage activated PET industrial yarn possesses the mechanical performance indices of fineness 930 dtex, breaking strength 7.77 cN/dtex, deviation rate of linear density −1.1%, breaking strength CV value 2.5%, elongation at break 10.8%, deviation rate of elongation ±1.5%, elongation at break CV value 8.0%, elongation at 4.0 cN/dtex load 6.0%, deviation rate of elongation at 4.0 cN/dtex load −0.8%, interlacing degree 3/m, dry heat shrinkage 2.1% (tested under the condition of 177° C.×10 min×0.05 cN/dtex), static adhesion to the vulcanized rubber 46N or 52N (determined through H-pull method when made into cord with a specification of 1100 dtex/192 F or 1670 dtex/192 F, respectively).

From the data analysis on the Example 1 and Comparison 1-3, it can be concluded that the tere-butyl branched diol, compared with 1,2-dodecyl glycol containing long alkyl chain, is more beneficial to the activation of PET fibers, and the reason on one hand is that the short side chain can enlarge the void free volume whereas the long side can mainly enlarge the slit free volume, and the void free volume is more efficient than the slit one for the penetration of activator agents into the fiber, on the other hand, the short side chain with higher rigidity will seldom cause the molecular chain entanglement and gain more free volume in the molecular aggregate.

Example 2

A method for preparing the high-modulus-low-shrinkage activated PET industrial yarn, comprising the steps:

(1) Preparation of modified polyester (1.1) Synthesizing 2,6,6-trimethyl-2,5-heptanediol (a) mixing isobutanol and 40% of KOH aqueous solution in the molar ratio of isobutanol to KOH as 5.5:1, then carrying out the reaction with a stirring at 100° C. for 5 hr to obtain potassium isobutanol;

(b) removing the impurities from the system in step (a), then adding in xylene in the molar ratio of isobutanol to xylene as 1.3:2.0 and cooling the system to 3° C.;

(c) adding 3-methyl-3-hydroxybutyne and 2,2-dimethylpropionaldehyde into the system of step (b) in a molar ratio of 3-methyl-3-hydroxybutyne:2,2-dimethylpropionaldehyde:xylene as 1:1.3:2.5, then starting the reaction at 30° C. for 3 hr, and obtaining octyne diol after a series of processes of cooling crystallization, centrifugation and drying;

(d) mixing octyne diol, ethanol and Pd catalyst in a weight ratio of 2.5:10:0.01 and then carrying out the reaction accompanied with a continuous hydrogen input at 50° C. for 55 min, finally obtaining 2,6,6-trimethyl-2,5-heptanediol (just as demonstrated in Formula (I) with R=—H) through a series of processes of separation and purification;

(1.3) Esterification concocting terephthalic acid, ethylene glycol and 2,6,6-trimethyl-2,5-heptanediol with an molar ratio of 1:1.3:0.04 into a slurry, then adding in antimony trioxide, titanium dioxide and triphenyl phosphate and carrying out the esterification in a nitrogen atmosphere with a pressure of 0.15 MPa at 252° C., finally ending the reaction when the water distillation reaching 91% of the theoretical value, wherein the additions of antimony trioxide, titanium dioxide and triphenyl phosphate being 0.035 wt %, 0.22 wt % and 0.015 wt % relative to the amount of terephthalic acid, respectively;

(1.3) Polycondensation for the esterification products, smoothly reducing the pressure to 498 Pa (absolute value) within 32 min and carrying out reaction at 252° C. for 32 min, successively, further reducing the pressure to 99 Pa (absolute value) and continuing the reaction at 272° C. for 55 min, and finally obtaining a modified polyester with a molecular weight of 30500 Da and a molecular weight distribution index of 1.85;

(1.4) increasing the intrinsic viscosity of the modified polyester to 1.05 dL/g through the solid state polycondensation;

(2) converting the modified polyester into the high-modulus-low-shrinkage activated PET industrial yarn through a melt spinning technique including a series of steps such as melting, metering, extruding, cooling, oiling, stretching, heat setting, relaxation heat-treating, oiling of activation oil agent, winding and pre-activation treating.

The relaxation heat-treating indicates passing the PET yarns, with a wind overfeeding rate of 4.2%, through the space formed by a pair of parallel hot plates (202° C.), therein the hot plates is installed between the last set of heat setting rollers and the winding roller, therein the hot plates are aligned in both side and have a length of 3.2 m along the passing direction of fiber; therein the fiber passes through the center of two hot plates and keep a distance of 6 mm from both sides, therein the hot plates are 311 mm from the winding roller and 220 mm from the last set of heat setting rollers.

The technological parameters of the melt spinning are listed in Table 1 and those of the stretching and the heat setting are list in Table 2.

The final obtained high-modulus-low-shrinkage activated PET industrial yarn possess the performance indices of fineness 1070 dtex, breaking strength 8.0 cN/dtex, deviation rate of linear density −1.0%, breaking strength CV value 2.1%, elongation at break 12.5%, deviation rate of elongation −1.2%, elongation at break CV value 7.5%, elongation at 4.0 cN/dtex load 6.2%, deviation rate of elongation at 4.0 cN/dtex load −0.6%, interlacing degree 6/m, dry heat shrinkage 2.2% (tested under the condition of 177° C.×10 min× 0.05 cN/dtex), static adhesion to the vulcanized rubber 50N or 57N (determined through H-pull method when made into cord with a specification of 1100 dtex/192 F or 1670 dtex/192 F, respectively).

Example 3

A method for preparing the high-modulus-low-shrinkage activated PET industrial yarn, comprising the steps:

(1) Preparation of modified polyester (1.1) Synthesizing 2,6,6-trimethyl-2,5-heptanediol (a) mixing isobutanol and 48% of KOH aqueous solution in the molar ratio of isobutanol to KOH as 5:1, then carrying out the reaction with a stirring at 105° C. for 4.5 hr to obtain potassium isobutanol;

(b) removing the impurities from the system in step (a), then adding in xylene in the molar ratio of isobutanol to xylene as 1.5:2.5 and cooling the system to 0° C.;

(c) adding 3-methyl-3-hydroxybutyne and 2,2-dimethylpropionaldehyde into the system of step (b) in a molar ratio of 3-methyl-3-hydroxybutyne:2,2-dimethylpropionaldehyde:xylene as 1:1.25:2.0, then starting the reaction at 30° C. for 3 hr, and obtaining octyne diol after a series of processes of cooling crystallization, centrifugation and drying;

(d) mixing octyne diol, ethanol and Pd catalyst in a weight ratio of 2:10:0.02 and then carrying out the reaction accompanied with a continuous hydrogen input at 42° C. for 60 min, finally obtaining 2,6,6-trimethyl-2,5-heptanediol (just as demonstrated in Formula (I) with R=—H) through a series of processes of separation and purification;

(1.3) Esterification concocting terephthalic acid, ethylene glycol and 2,6,6-trimethyl-2,5-heptanediol with an molar ratio of 1:1.4:0.035 into a slurry, then adding in antimony glycol, titanium dioxide and triphenyl phosphate and carrying out the esterification in a nitrogen atmosphere with a pressure of 0.18 MPa at 253° C., finally ending the reaction when the water distillation reaching 92% of the theoretical value, wherein the additions of antimony glycol, titanium dioxide and triphenyl phosphate being 0.04 wt %, 0.23 wt % and 0.02 wt % relative to the amount of terephthalic acid, respectively;

(1.3) Polycondensation for the esterification products, smoothly reducing the pressure to 497 Pa (absolute value) within 35 min and carrying out reaction at 253° C. for 35 min, successively, further reducing the pressure to 98 Pa (absolute value) and continuing the reaction at 274° C. for 62 min, and finally obtaining a modified polyester with a molecular weight of 32000 Da and a molecular weight distribution index of 1.9;

(1.4) increasing the intrinsic viscosity of the modified polyester to 1.08 dL/g through the solid state polycondensation;

(2) converting the modified polyester into the high-modulus-low-shrinkage activated PET industrial yarn through a melt spinning technique including a series of steps such as melting, metering, extruding, cooling, oiling, stretching, heat setting, relaxation heat-treating, oiling of activation oil agent, winding and pre-activation treating.

The relaxation heat-treating indicates passing the PET yarns, with a wind overfeeding rate of 3.3%, through the space formed by a pair of parallel hot plates (210° C.), therein the hot plates is installed between the last set of heat setting rollers and the winding roller, therein the hot plates are aligned in both side and have a length of 3.3 m along the passing direction of fiber; therein the fiber passes through the center of two hot plates and keep a distance of 7 mm from both sides, therein the hot plates are 335 mm from the winding roller and 235 mm from the last set of heat setting rollers.

The technological parameters of the melt spinning are listed in Table 1 and those of the stretching and the heat setting are list in Table 2.

The final obtained high-modulus-low-shrinkage activated PET industrial yarn possess the performance indices of fineness 1170 dtex, breaking strength 8.3 cN/dtex, deviation rate of linear density −0.2%, breaking strength CV value 2.3%, elongation at break 12.5%, deviation rate of elongation 1.0%, elongation at break CV value 7.0%, elongation at 4.0 cN/dtex load 6.6%, deviation rate of elongation at 4.0 cN/dtex load 0.3%, interlacing degree 8/m, dry heat shrinkage 2.6% (tested under the condition of 177° C.×10 min× 0.05 cN/dtex), static adhesion to the vulcanized rubber 52N or 58N (determined through H-pull method when made into cord with a specification of 1100 dtex/192 F or 1670 dtex/192 F, respectively).

Example 4

A method for preparing the high-modulus-low-shrinkage activated PET industrial yarn, comprising the steps:
(1) Preparation of modified polyester
(1.1) Synthesizing 2,6,6-trimethyl-2,5-heptanediol
(a) mixing isobutanol and 41% of KOH aqueous solution in the molar ratio of isobutanol to KOH as 6:1, then carrying out the reaction with a stirring at 110° C. for 4.8 hr to obtain potassium isobutanol;
(b) removing the impurities from the system in step (a), then adding in xylene in the molar ratio of isobutanol to xylene as 1.4:3.0 and cooling the system to 0° C.;
(c) adding 3-methyl-3-hydroxybutyne and 2,2-dimethylpropionaldehyde into the system of step (b) in a molar ratio of 3-methyl-3-hydroxybutyne:2,2-dimethylpropionaldehyde:xylene as 1:1.3:2.6, then starting the reaction at 35° C. for 3 hr, and obtaining octyne diol after a series of processes of cooling crystallization, centrifugation and drying;
(d) mixing octyne diol, ethanol and Pd catalyst in a weight ratio of 3:10:0.01 and then carrying out the reaction accompanied with a continuous hydrogen input at 40° C. for 60 min, finally obtaining 2,6,6-trimethyl-2,5-heptanediol (just as demonstrated in Formula (I) with R=—H) through a series of processes of separation and purification;
(1.3) Esterification
concocting terephthalic acid, ethylene glycol and 2,6,6-trimethyl-2,5-heptanediol with an molar ratio of 1:1.5:0.03 into a slurry, then adding in antimony glycol, titanium dioxide and trimethyl phosphate and carrying out the esterification in a nitrogen atmosphere with a pressure of 0.20 mPa at 255° C., finally ending the reaction when the water distillation reaching 93% of the theoretical value, wherein the additions of antimony glycol, titanium dioxide and trimethyl phosphate being 0.045 wt %, 0.24 wt % and 0.025 wt % relative to the amount of terephthalic acid, respectively;
(1.3) Polycondensation
for the esterification products, smoothly reducing the pressure to 495 Pa (absolute value) within 38 min and carrying out reaction at 255° C. for 38 min, successively, further reducing the pressure to 97 Pa (absolute value) and continuing the reaction at 276° C. for 67 min, and finally obtaining a modified polyester with a molecular weight of 32000 Da and a molecular weight distribution index of 1.92;
(1.4) increasing the intrinsic viscosity of the modified polyester to 1.1 dL/g through the solid state polycondensation;
(2) converting the modified polyester into the high-modulus-low-shrinkage activated PET industrial yarn through a melt spinning technique including a series of steps such as melting, metering, extruding, cooling, oiling, stretching, heat setting, relaxation heat-treating, oiling of activation oil agent, winding and pre-activation treating.

The relaxation heat-treating indicates passing the PET yarns, with a wind overfeeding rate of 4.8%, through the space formed by a pair of parallel hot plates (240° C.), therein the hot plates is installed between the last set of heat setting rollers and the winding roller, therein the hot plates are aligned in both side and have a length of 3.4 m along the passing direction of fiber; therein the fiber passes through the center of two hot plates and keep a distance of 8 mm from both sides, therein the hot plates are 346 mm from the winding roller and 250 mm from the last set of heat setting rollers.

The technological parameters of the melt spinning are listed in Table 1 and those of the stretching and the heat setting are list in Table 2.

The final obtained high-modulus-low-shrinkage activated PET industrial yarn possess the performance indices of fineness 1370 dtex, breaking strength 7.9 cN/dtex, deviation rate of linear density 1.0%, breaking strength CV value 2.4%, elongation at break 12.0%, deviation rate of elongation 1.0%, elongation at break CV value 6.9%, elongation at 4.0 cN/dtex load 6.5%, deviation rate of elongation at 4.0 cN/dtex load −0.3%, interlacing degree 7/m, dry heat shrinkage 2.7% (tested under the condition of 177° C.×10 min× 0.05 cN/dtex), static adhesion to the vulcanized rubber 52N or 59N (determined through H-pull method when made into cord with a specification of 1100 dtex/192 F or 1670 dtex/192 F, respectively).

Example 5

A method for preparing the high-modulus-low-shrinkage activated PET industrial yarn, comprising the steps:
(1) Preparation of modified polyester
(1.1) Synthesizing 2,6,6-trimethyl-2,5-heptanediol
(a) mixing isobutanol and 50% of KOH aqueous solution in the molar ratio of isobutanol to KOH as 5.4:1, then carrying out the reaction with a stirring at 110° C. for 5 hr to obtain potassium isobutanol;
(b) removing the impurities from the system in step (a), then adding in xylene in the molar ratio of isobutanol to xylene as 1.4:2.6 and cooling the system to 4° C.;
(c) adding 3-methyl-3-hydroxybutyne and 2,2-dimethylpropionaldehyde into the system of step (b) in a molar ratio of 3-methyl-3-hydroxybutyne:2,2-dimethylpropionaldehyde:xylene as 1:1.2:3.0, then starting the reaction at 28° C. for 3 hr, and obtaining octyne diol after a series of processes of cooling crystallization, centrifugation and drying;
(d) mixing octyne diol, ethanol and Pd catalyst in a weight ratio of 2.5:10:0.03 and then carrying out the reaction accompanied with a continuous hydrogen input at 44° C. for 53 min, finally obtaining 2,6,6-trimethyl-2,5-heptanediol (just as demonstrated in Formula (I) with R=—H) through a series of processes of separation and purification;
(1.3) Esterification
concocting terephthalic acid, ethylene glycol and 2,6,6-trimethyl-2,5-heptanediol with an molar ratio of 1:1.6:0.04 into a slurry, then adding in antimony acetate, titanium dioxide and trimethyl phosphate and carrying out the esterification in a nitrogen atmosphere with a pressure of 0.25 MPa at 256° C., finally ending the reaction when the water distillation reaching 94% of the theoretical value, wherein the additions of antimony acetate, titanium dioxide and trimethyl phosphate being 0.05 wt %, 0.20 wt % and 0.03 wt % relative to the amount of terephthalic acid, respectively;
(1.3) Polycondensation
for the esterification products, smoothly reducing the pressure to 492 Pa (absolute value) within 40 min and carrying out reaction at 256° C. for 40 min, successively, further reducing the pressure to 95 Pa (absolute value) and continuing the reaction at 278° C. for 72 min, and finally obtaining a modified polyester with a molecular weight of 33030 Da and a molecular weight distribution index of 1.95;

(1.4) increasing the intrinsic viscosity of the modified polyester to 1.15 dL/g through the solid state polycondensation;

(2) converting the modified polyester into the high-modulus-low-shrinkage activated PET industrial yarn through a melt spinning technique including a series of steps such as melting, metering, extruding, cooling, oiling, stretching, heat setting, relaxation heat-treating, oiling of activation oil agent, winding and pre-activation treating.

The relaxation heat-treating indicates passing the PET yarns, with a wind overfeeding rate of 4.0%, through the space formed by a pair of parallel hot plates (220° C.), therein the hot plates is installed between the last set of heat setting rollers and the winding roller, therein the hot plates are aligned in both side and have a length of 3.6 m along the passing direction of fiber; therein the fiber passes through the center of two hot plates and keep a distance of 8.5 mm from both sides, therein the hot plates are 368 mm from the winding roller and 260 mm from the last set of heat setting rollers.

The technological parameters of the melt spinning are listed in Table 1 and those of the stretching and the heat setting are list in Table 2.

The final obtained high-modulus-low-shrinkage activated PET industrial yarn possess the performance indices of fineness 1290 dtex, breaking strength 8.3 cN/dtex, deviation rate of linear density 1.0%, breaking strength CV value 2.3%, elongation at break 12.9%, deviation rate of elongation 1.0%, elongation at break CV value 6.6%, elongation at 4.0 cN/dtex load 6.2%, deviation rate of elongation at 4.0 cN/dtex load 0.1%, interlacing degree 8/m, dry heat shrinkage 2.6% (tested under the condition of 177° C.×10 min× 0.05 cN/dtex), static adhesion to the vulcanized rubber 42N or 60N (determined through H-pull method when made into cord with a specification of 1100 dtex/192 F or 1670 dtex/192 F, respectively).

Example 6

A method for preparing the high-modulus-low-shrinkage activated PET industrial yarn, comprising the steps:

(1) Preparation of modified polyester (1.1) Synthesizing 2,6,6-trimethyl-2,5-heptanediol (a) mixing isobutanol and 40% of KOH aqueous solution in the molar ratio of isobutanol to KOH as 5:1, then carrying out the reaction with a stirring at 106° C. for 4.5 hr to obtain potassium isobutanol;

(b) removing the impurities from the system in step (a), then adding in xylene in the molar ratio of isobutanol to xylene as 1.3:2.0 and cooling the system to 2° C.;

(c) adding 3-methyl-3-hydroxybutyne and 2,2-dimethylpropionaldehyde into the system of step (b) in a molar ratio of 3-methyl-3-hydroxybutyne:2,2-dimethylpropionaldehyde:xylene as 1:1.3:2.5, then starting the reaction at 32° C. for 3 hr, and obtaining octyne diol after a series of processes of cooling crystallization, centrifugation and drying;

(d) mixing octyne diol, ethanol and Pd catalyst in a weight ratio of 2:10:0.01 and then carrying out the reaction accompanied with a continuous hydrogen input at 48° C. for 50 min, finally obtaining 2,6,6-trimethyl-2,5-heptanediol (just as demonstrated in Formula (I) with R=—H) through a series of processes of separation and purification;

(1.2) Esterification concocting terephthalic acid, ethylene glycol and 2,6,6-trimethyl-2,5-heptanediol with an molar ratio of 1:1.8:0.05 into a slurry, then adding in antimony acetate, titanium dioxide and trimethyl phosphite and carrying out the esterification in a nitrogen atmosphere with a pressure of 0.28 MPa at 258° C., finally ending the reaction when the water distillation reaching 94% of the theoretical value, wherein the additions of antimony acetate, titanium dioxide and trimethyl phosphite being 0.05 wt %, 0.20 wt % and 0.04 wt % relative to the amount of terephthalic acid, respectively;

(1.3) Polycondensation for the esterification products, smoothly reducing the pressure to 490 Pa (absolute value) within 42 min and carrying out reaction at 258° C. for 42 min, successively, further reducing the pressure to 94 Pa (absolute value) and continuing the reaction at 280° C. for 82 min, and finally obtaining a modified polyester with a molecular weight of 34400 Da and a molecular weight distribution index of 1.96;

(1.4) increasing the intrinsic viscosity of the modified polyester to 1.18 dL/g through the solid state polycondensation;

(2) converting the modified polyester into the high-modulus-low-shrinkage activated PET industrial yarn through a melt spinning technique including a series of steps such as melting, metering, extruding, cooling, oiling, stretching, heat setting, relaxation heat-treating, oiling of activation oil agent, winding and pre-activation treating.

The relaxation heat-treating indicates passing the PET yarns, with a wind overfeeding rate of 3.0%, through the space formed by a pair of parallel hot plates (215° C.), therein the hot plates is installed between the last set of heat setting rollers and the winding roller, therein the hot plates are aligned in both side and have a length of 3.8 m along the passing direction of fiber; therein the fiber passes through the center of two hot plates and keep a distance of 9 mm from both sides, therein the hot plates are 384 mm from the winding roller and 280 mm from the last set of heat setting rollers.

The technological parameters of the melt spinning are listed in Table 1 and those of the stretching and the heat setting are list in Table 2.

The final obtained high-modulus-low-shrinkage activated PET industrial yarn possess the performance indices of fineness 1570 dtex, breaking strength 7.9 cN/dtex, deviation rate of linear density 1.0%, breaking strength CV value 2.4%, elongation at break 13.0%, deviation rate of elongation 1.2%, elongation at break CV value 6.6%, elongation at 4.0 cN/dtex load 7.0%, deviation rate of elongation at 4.0 cN/dtex load 0.8%, interlacing degree 6/m, dry heat shrinkage 2.7% (tested under the condition of 177° C.×10 min× 0.05 cN/dtex), static adhesion to the vulcanized rubber 51N or 61N (determined through H-pull method when made into cord with a specification of 1100 dtex/192 F or 1670 dtex/192 F, respectively).

Example 7

A method for preparing the high-modulus-low-shrinkage activated PET industrial yarn, comprising the steps:

(1) Preparation of modified polyester (1.1) Synthesizing 2,6,6-trimethyl-2,5-heptanediol (a) mixing isobutanol and 46% of KOH aqueous solution in the molar ratio of isobutanol to KOH as 5.5:1, then carrying out the reaction with a stirring at 100° C. for 4 hr to obtain potassium isobutanol;

(b) removing the impurities from the system in step (a), then adding in xylene in the molar ratio of isobutanol to xylene as 1.3:2.6 and cooling the system to 5° C.;

(c) adding 3-methyl-3-hydroxybutyne and 2,2-dimethylpropionaldehyde into the system of step (b) in a molar ratio of 3-methyl-3-hydroxybutyne:2,2-dimethylpropionaldehyde:xylene as 1:1.24:3.0, then starting the reaction at 25° C. for 3 hr, and obtaining octyne diol after a series of processes of cooling crystallization, centrifugation and drying;

(d) mixing octyne diol, ethanol and Pd catalyst in a weight ratio of 3:10:0.03 and then carrying out the reaction accompanied with a continuous hydrogen input at 40° C. for 56 min, finally obtaining 2,6,6-trimethyl-2,5-heptanediol (just as demonstrated in Formula (I) with R=—H) through a series of processes of separation and purification;

(1.2) Esterification concocting terephthalic acid, ethylene glycol and 2,6,6-trimethyl-2,5-heptanediol with an molar ratio of 1:2.0:0.03 into a slurry, then adding in antimony acetate, titanium dioxide and trimethyl phosphite and carrying out the esterification in a nitrogen atmosphere with a pressure of 0.3 MPa at 260° C., finally ending the reaction when the water distillation reaching 96% of the theoretical value, wherein the additions of antimony acetate, titanium dioxide and trimethyl phosphite being 0.05 wt %, 0.20 wt % and 0.05 wt % relative to the amount of terephthalic acid, respectively;

(1.3) Polycondensation for the esterification products, smoothly reducing the pressure to 490 Pa (absolute value) within 50 min and carrying out reaction at 260° C. for 50 min, successively, further reducing the pressure to 92 Pa (absolute value) and continuing the reaction at 282° C. for 90 min, and finally obtaining a modified polyester with a molecular weight of 35000 Da and a molecular weight distribution index of 2.2;

(1.4) increasing the intrinsic viscosity of the modified polyester to 1.2 dL/g through the solid state polycondensation;

(2) converting the modified polyester into the high-modulus-low-shrinkage activated PET industrial yarn through a melt spinning technique including a series of steps such as melting, metering, extruding, cooling, oiling, stretching, heat setting, relaxation heat-treating, oiling of activation oil agent, winding and pre-activation treating.

The relaxation heat-treating indicates passing the PET yarns, with a wind overfeeding rate of 5.0%, through the space formed by a pair of parallel hot plates (220° C.), therein the hot plates is installed between the last set of heat setting rollers and the winding roller, therein the hot plates are aligned in both side and have a length of 4 m along the passing direction of fiber; therein the fiber passes through the center of two hot plates and keep a distance of 10 mm from both sides, therein the hot plates are 400 mm from the winding roller and 300 mm from the last set of heat setting rollers.

The technological parameters of the melt spinning are listed in Table 1 and those of the stretching and the heat setting are list in Table 2.

The final obtained high-modulus-low-shrinkage activated PET industrial yarn possess the performance indices of fineness 1670 dtex, breaking strength 8.5 cN/dtex, deviation rate of linear density 1.2%, breaking strength CV value 2.0%, elongation at break 13.5%, deviation rate of elongation 1.5%, elongation at break CV value 6.4%, elongation at 4.0 cN/dtex load 7.0%, deviation rate of elongation at 4.0 cN/dtex load 0.8%, interlacing degree 9/m, dry heat shrinkage 3.0% (tested under the condition of 177° C.×10 min× 0.05 cN/dtex), static adhesion to the vulcanized rubber 53N or 62N (determined through H-pull method when made into cord with a specification of 1100 dtex/192 F or 1670 dtex/192 F, respectively).

TABLE 1

|  | Example 1 | Example 2 | Example 3 | Example 4 | Example 5 | Example 6 | Example 7 |
| --- | --- | --- | --- | --- | --- | --- | --- |
| Extruder temperature | 295° C. | 301° C. | 308° C. | 310° C. | 311° C. | 312° C. | 315° C. |
| Pack temperature | 295° C. | 296° C. | 297° C. | 298° C. | 298° C. | 299° C. | 300° C. |
| Die pressure | 170 bar | 172 bar | 174 bar | 175 bar | 176 bar | 178 bar | 180 bar |
| Cooling air temperature | 21° C. | 22° C. | 23° C. | 24° C. | 25° C. | 25° C. | 24° C. |
| Cooling air moisture | 70% | 73% | 80% | 80% | 80% | 80% | 80% |
| Cooling air speed | 0.45 m/s | 0.48 m/s | 0.50 m/s | 0.55 m/s | 0.60 m/s | 0.62 m/s | 0.65 m/s |
| Pre-interlacing pressure | 0.14 MPa | 0.15 MPa | 0.15 MPa | 0.16 MPa | 0.16 MPa | 0.16 MPa | 0.18 MPa |
| Interlacing pressure | 0.20 mP | 0.20 mPa | 0.21 MPa | 0.21 MPa | 0.22 MPa | 0.23 MPa | 0.24 MPa |
| Winding speed | 2630 m/min | 2800 m/min | 2950 m/min | 3300 m/min | 3070 m/min | 3200 m/min | 3230 m/min |
| Pre-activation temperature | 70° C. | 72° C. | 75° C. | 72° C. | 71° C. | 70° C. | 75° C. |
| Pre-activation time | 15 h | 16 h | 20 h | 16 h | 15 h | 18 h | 18 h |

TABLE 2

|  | Example 1 | Example 2 | Example 3 | Example 4 | Example 5 | Example 6 | Example 7 |
| --- | --- | --- | --- | --- | --- | --- | --- |
| Roller 1 speed | 500 m/min | 525 m/min | 550 m/min | 540 m/min | 560 m/min | 575 m/min | 600 m/min |
| Roller 2 speed | 520 m/min | 580 m/min | 670 m/min | 750 m/min | 880 m/min | 900 m/min | 1000 m/min |
| Roller 2 temperature | 80° C. | 83° C. | 86° C. | 90° C. | 92° C. | 96° C. | 100° C. |
| Roller 3 speed | 1800 m/min | 1900 m/min | 2000 m/min | 2200 m/min | 2300 m/min | 2400 m/min | 2500 m/min |
| Roller 3 temperature | 100° C. | 105° C. | 110° C. | 120° C. | 125° C. | 130° C. | 150° C. |
| Roller 4 speed | 2800 m/min | 2900 m/min | 3000 m/min | 3150 m/min | 3230 m/min | 3450 m/min | 3500 m/min |
| Roller 4 temperature | 200° C. | 210° C. | 210° C. | 220° C.; | 230° C. | 240° C. | 250° C. |
| Roller 5 speed | 2800 m/min | 2900 m/min | 3000 m/min | 3150 m/min | 3230 m/min | 3450 m/min | 3500 m/min |

What is claimed is:

1. A preparing method for a high-modulus-low-shrinkage activated Polyethylene terephthalate (PET) industrial yarn, comprising manufacturing a filament from a modified polyester through a series of processes comprising composed of viscosity enhancing by solid state polycondensation, melting, metering, extruding, cooling, oiling, stretching, heat setting, relaxation heat-treating, oiling with activation oil, winding and pre-activation treatment;

wherein the modified polyester before the viscosity enhancing by the solid state polycondensation is a product of esterification and successive polycondensation reactions of an evenly mixed mixture of terephthalic acid, ethylene glycol and tert-butyl branched heptanediol, wherein the tert-butyl branched heptanediol has a molecular formula of

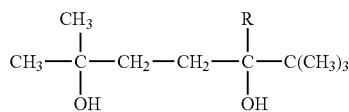

with R standing for —H, —$CH_2CH_3$ or —$C(CH_3)_3$;

wherein the relaxation heat-treating indicates passing modified polyester yarns through a space with a certain temperature under a proper relaxation state;

wherein the proper relaxation state is a 3.0-5.0% of overfeed for the winding; and the certain temperature is within a range of 200-220° C.

2. The preparing method of claim 1, wherein the high-modulus-low-shrinkage activated Polyethylene terephthalate (PET) industrial yarn has the following performance indices: a fineness of 930-1670 dtex, a breaking strength ≥7.8 cN/dtex, a deviation rate of linear density of ±1.2%, a breaking strength CV value ≤2.5%, an elongation at break of 11.0-13.5%, an deviation rate of elongation of ±1.5%, an elongation at break CV value ≤8.0%, an elongation at 4.0 cN/dtex load of 6.0-7.0%, a deviation rate of elongation at 4.0 cN/dtex load of ±0.8%, an interlacing degree of 6±2-3/m.

3. The preparing method of claim 2, wherein the high-modulus-low-shrinkage activated PET industrial yarn has a dry heat shrinkage of 2.5±0.5% tested under a condition of 177° C.×10 min×0.05 cN/dtex, and shows a static adhesion of 49-53 N or 55-62 N to a vulcanized rubber, wherein the static adhesion is determined through H-pull method when the high-modulus-low-shrinkage activated Polyethylene terephthalate (PET) industrial yarn is made into a cord with a specification of 1100 dtex/192 F or 1670 dtex/192 F.

4. The preparing method of claim 1, wherein the space with the certain temperature indicates a room formed by a pair of parallel hot plates located between the last set of heat setting rollers and winding roller; wherein the parallel hot plates are aligned in both sides and have a length of 3.0-4.0 m along a passing direction of the filament; wherein the filament passes through a center of the parallel hot plates and keep a distance of 5-10 mm from the both sides, wherein the parallel hot plates are 300-400 mm from the winding roller and 200-300 mm from the last set of the heat setting rollers.

5. The preparing method of claim 1, wherein the tert-butyl branched heptanediol is synthesized by means of:

(1) mixing isobutanol and a 40-50% KOH aqueous solution with a molar ratio of the isobutanol to the KOH as (5-6):1, then carrying out a first reaction with stirring at 100-110° C. for 4-5 hr to obtain potassium isobutanol in a first reaction mixture;

(2) removing impurities from the first reaction mixture in step (1), then adding in xylene to the potassium isobutanol to form a second reaction mixture with a molar ratio of the potassium isobutanol to the xylene as (1.3-1.5):(2.0-3.0) and cooling the second reaction mixture to 0-5° C.;

(3) adding 3-methyl-3-hydroxybutyne and M into the second reaction mixture of step (2) with a molar ratio of 3-methyl-3-hydroxybutyne:M:xylene as 1:(1.2-1.3):(2.0-3.0), then starting a second reaction at 25-35° C. for 3 hr, and obtaining octyne diol after a series of processes of cooling crystallization, centrifugation and drying;

(4) mixing the octyne diol, ethanol and a Pd catalyst with a weight ratio of (2-3):10:(0.01-0.03) and then carrying out a third reaction accompanied by a continuous hydrogen input at 40-50° C. for 50-60 min, and finally obtaining the tert-butyl branched heptanediol through a series of processes of separation and purification;

wherein M is 2,2-dimethylpropionaldehyde, 2,2-dimethyl-3-pentanone, 2,2,4-trimethyl-3-pentanone or 2,2,4,4-tetramethyl-3-pentanone when R=—H, —$CH_2CH_3$, —$CH(CH_3)_2$ or —$C(CH_3)_3$ in the molecular formula, respectively.

6. The preparing method of claim 5, wherein the modified polyester is manufactured through following steps:

(1) Esterification concocting the terephthalic acid, the ethylene glycol and the tert-butyl branched heptanediol into a slurry, then adding in a catalyst, a matting agent and a stabilizer, and carrying out the esterification in a nitrogen atmosphere with a pressure of normal value-0.3 MPa at 250-260° C., finally ending the esterification when water distillation reaches more than 90% of a theoretical value;

(2) Polycondensation for products of the esterification, smoothly reducing the pressure to less than 500 Pa within 30-50 min and carrying out the polycondensation at 250-260° C. for 30-50 min, successively, further reducing the pressure to less than 100 Pa and continuing the polycondensation at 270-282° C. for 50-90 min.

7. The preparing method of claim 6, wherein a molar ratio of the terephthalic acid, the ethylene glycol and the tert-butyl branched heptanediol is 1:(1.2-2.0):(0.03-0.05), and additions of the catalyst, the matting agent and the stabilizer are respectively 0.03-0.05 wt %, 0.20-0.25 wt % and 0.01-0.05 wt % of an amount of the terephthalic acid.

8. The preparing method of claim 7, wherein the catalyst is one of antimony trioxide, antimony glycol or antimony acetate; the matting agent is titanium dioxide; and the stabilizer is one of triphenyl phosphate, trimethyl phosphate or trimethyl phosphite.

9. The preparing method claim 8, wherein the modified polyester has a molecular weight of 25000-30000 Da and a molecular weight distribution index of 1.8-2.2 prior to the viscosity enhancing by the solid state polycondensation, and after has an intrinsic viscosity of 1.0-1.2 dL/g.

10. The preparing method of claim 1, wherein spinning process involves technological parameters of 295-315° C. for an extruder temperature, 295-300° C. for a spin head temperature, 175±5 bar for a spin head pressure, 23±2° C. for a cross air temperature, 75±5% for a cross air humidity, 0.5-0.6±0.05 m/s for a cross air blow speed, 0.4-0.5 wt % for an oiling rate of activation oil agent, 0.16±0.02 MPa for a pre-interlacing pressure, 0.22±0.02 MPa for an interlacing pressure, 2630-3300 m/min for a winding speed, 70~75° C. for a pre-activation treatment temperature and 15-20 hr for a pre-activation treatment time;

and wherein the stretching and heat setting involve technological parameters of 500-600 m/min for a roller 1 speed, 520-1000 m/min for a roller 2 speed, 80-100° C. for a roller 2 temperature, 1800-2500 m/min for a roller 3 speed, 100-150° C. for a roller 3 temperature, 2800-3500 m/min for a roller 4 speed, 200-250° C. for a roller 4 temperature, 2800-3500 m/min for a roller 5 speed, 200-250° C. for a roller 5 temperature, 2720-3410 m/min for a roller 6 speed, 150-200° C. for a roller 6 temperature.

* * * * *